(12) United States Patent
Muenter

(10) Patent No.: US 9,598,604 B2
(45) Date of Patent: Mar. 21, 2017

(54) PROCESS FOR THE PRODUCTION OF POLYURETHANE POLYUREAS CONTAINING SIDE CHAINS AND OF AQUEOUS DISPERSIONS OF THESE

(75) Inventor: Juergen Muenter, Fellbach (DE)

(73) Assignee: STAHL INTERNATIONAL B.V., Waalwijk (NL)

( * ) Notice: Subject to any disclaimer, the term of this patent is extended or adjusted under 35 U.S.C. 154(b) by 269 days.

(21) Appl. No.: 14/233,634

(22) PCT Filed: May 22, 2012

(86) PCT No.: PCT/EP2012/002163
§ 371 (c)(1),
(2), (4) Date: Jan. 17, 2014

(87) PCT Pub. No.: WO2013/010606
PCT Pub. Date: Jan. 24, 2013

(65) Prior Publication Data
US 2014/0147632 A1 May 29, 2014

(30) Foreign Application Priority Data
Jul. 19, 2011 (DE) ........................ 10 2011 107 873

(51) Int. Cl.
| | | |
|---|---|---|
| C09D 175/04 | (2006.01) |
| C08G 18/48 | (2006.01) |
| C08G 18/61 | (2006.01) |
| C08G 18/66 | (2006.01) |
| C08G 18/71 | (2006.01) |
| C08G 18/72 | (2006.01) |
| C08G 18/73 | (2006.01) |

(Continued)

(52) U.S. Cl.
CPC ....... *C09D 175/04* (2013.01); *C08G 18/0823* (2013.01); *C08G 18/12* (2013.01); *C08G 18/3831* (2013.01); *C08G 18/4238* (2013.01); *C08G 18/4277* (2013.01); *C08G 18/44* (2013.01); *C08G 18/4808* (2013.01); *C08G 18/4854* (2013.01); *C08G 18/61* (2013.01); *C08G 18/6659* (2013.01); *C08G 18/6692* (2013.01); *C08G 18/71* (2013.01); *C08G 18/722* (2013.01); *C08G 18/73* (2013.01); *C08G 18/755* (2013.01); *C08G 18/758* (2013.01); *C08G 71/04* (2013.01); *C14C 11/006* (2013.01); *Y10T 428/24438* (2015.01); *Y10T 428/31551* (2015.04); *Y10T 428/31558* (2015.04)

(58) Field of Classification Search
CPC C08G 18/12; C08G 18/3228; C08G 18/3231; C08G 18/3234; C08G 18/0823; C08G 18/3831; C08G 18/4238; C08G 18/4277; C08G 18/44; C08G 18/4808; C08G 18/4854; C08G 18/61; C08G 18/6659; C08G 18/6692; C08G 18/71; C08G 18/722; C08G 18/73; C08G 18/755; C08G 18/758; C08G 71/04; C09D 175/04; C14C 11/006; Y10T 428/24438; Y10T 428/31551; Y10T 428/31558
USPC .................... 428/151, 423.1, 423.4; 524/591
See application file for complete search history.

(56) References Cited

U.S. PATENT DOCUMENTS

| | | | |
|---|---|---|---|
| 2,802,022 A | * | 8/1957 | Drechsel ............... C07C 271/06 528/367 |
| 4,092,286 A | | 5/1978 | Noll |

(Continued)

FOREIGN PATENT DOCUMENTS

| | | |
|---|---|---|
| DE | 3049746 | 11/1982 |
| EP | 0043966 | 1/1982 |

(Continued)

OTHER PUBLICATIONS

Dederichs, "Tailor Make Polyether Diols", European Coatings Journal, 2002, 1-6.
Dieterich, "Aqueous Emulsions, Dispersions and Solutions of Polyurethanes; Synthesis and Properties", Progress in Organic Coatings vol. 9, 1981, 281-340.
Fournier, et al., ""Click" Chemistry as a Promising Tool for Side-Chain Functionalization of Polyurethanes", Macromolecules vol. 41, 2008, 4622-4630.
Tomita, et al., "Reactivity comparison of five- and six-membered cyclic carbonates with amines: Basic evaluation for synthesis of (Continued)

*Primary Examiner* — Thao T Tran
(74) *Attorney, Agent, or Firm* — Peacock Myers, P.C.; Jeffrey D. Myers

(57) ABSTRACT

The present invention relates to a process for the production of aqueous polyurethane-polyurea dispersions comprising the steps of:
A) reacting primary and/or secondary monoamines or diamines A1) with cyclic carbonate containing one hydroxy group A2) such that the molar ratio of total primary and/or secondary amine groups to cyclic carbonate groups is in the range of 0.8 to 1.2;
B) producing an NCO-containing polyurethane prepolymer by reacting B1) polyisocyanates with B2) polymeric polyols and/or polyamines having number average molecular weights of more than 400 to 8,000 g/mol, optionally B3) low molecular weight compounds having number average molecular weights of 17-400 g/mol selected from the group consisting of mono- and polyalcohols, mono- and polyamines, and aminoalcohols; optionally B4) isocyanate-reactive, ionically hydrophilizing compounds, and B5) the reaction products of A);
C) dispersing the prepolymer from B) in water; and
D) optionally reacting the remaining free NCO groups of the prepolymer from B) with monoamines, polyamines, hydrazine and/or hydrazides, wherein the molar ratio of the NH groups to the NCO groups is from 0 to 1.2, and step D) occurs partially or completely prior to or during the dispersion step C).

20 Claims, No Drawings

(51) Int. Cl.
*C08G 18/75* (2006.01)
*C08G 18/08* (2006.01)
*C08G 18/12* (2006.01)
*C08G 18/38* (2006.01)
*C08G 71/04* (2006.01)
*C08G 18/42* (2006.01)
*C08G 18/44* (2006.01)
*C14C 11/00* (2006.01)

(56) References Cited

U.S. PATENT DOCUMENTS

| | | | |
|---|---|---|---|
| 4,343,925 A * | 8/1982 | Chang | C09D 7/001 524/542 |
| 4,507,413 A * | 3/1985 | Thoma | C08G 18/0866 427/393.5 |
| 4,599,438 A | 7/1986 | White et al. | |
| 5,315,904 A | 5/1994 | Hashimoto et al. | |
| 5,385,999 A | 1/1995 | D'Anvers et al. | |
| 5,659,003 A | 8/1997 | Menovcik et al. | |
| 5,712,343 A | 1/1998 | Geck et al. | |
| 5,756,213 A * | 5/1998 | Ohrbom et al. | 428/412 |
| 5,808,125 A | 9/1998 | Standke et al. | |
| 5,977,262 A | 11/1999 | Anderson | |
| 5,990,245 A | 11/1999 | Esselborn | |
| 6,171,515 B1 | 1/2001 | Evans et al. | |
| 6,646,153 B1 | 11/2003 | Huybrechts et al. | |
| 2004/0254292 A1 * | 12/2004 | Williams | 524/589 |
| 2005/0159575 A1 | 7/2005 | Rische et al. | |
| 2006/0041026 A1 | 2/2006 | Mahr et al. | |
| 2009/0318656 A1 | 12/2009 | Poellmann et al. | |
| 2011/0082273 A1 | 4/2011 | Laas et al. | |
| 2011/0091712 A1 * | 4/2011 | Muenter | 428/304.4 |

FOREIGN PATENT DOCUMENTS

| | | |
|---|---|---|
| JP | 08-231674 | 9/1996 |
| JP | 2002-047328 | 2/2002 |
| JP | 2007-291157 | 11/2007 |
| JP | 2008-056758 | 3/2008 |
| JP | 2008-291143 | 12/2008 |
| JP | 2011-074390 | 4/2011 |
| WO | 2005/078182 | 8/2005 |
| WO | 2009/144157 | 12/2009 |
| WO | 2013/010606 | 1/2013 |

OTHER PUBLICATIONS poly(hydroxyurethane)", Journal of Polymer Science Part A: Polymer Chemistry vol. 39, Issue 1, 2001, 162-168.

* cited by examiner

US 9,598,604 B2

PROCESS FOR THE PRODUCTION OF POLYURETHANE POLYUREAS CONTAINING SIDE CHAINS AND OF AQUEOUS DISPERSIONS OF THESE

The present invention relates to a process for incorporating sidechains into mainly linear polyurethane-polyurea chains, aqueous dispersions thereof, and the use of the dispersions as part of the coating of a flexible sheetlike substrate.

The preparation of aqueous polyurethane-polyurea dispersions by means of the prepolymer ionomer process or the acetone process is well known, for example from Prog. Org. Coat. 9 (1981) 281-340. In either case, a prepolymer comprising isocyanate groups is prepared with or without a solvent and, if necessary, dissolved in solvents after the reaction has been carried out. Next the prepolymer or prepolymer solution is dispersed in water and subjected to a chain extension reaction with polyamines. The extension reaction can be carried out partially or else completely before the dispersing. Finally, the solvent is optionally distilled off.

In addition to electrostatic stabilization by carboxylate groups, aqueous polyurethane dispersions are also prepared using nonionically, hydrophilic, sterically stabilizing groups. This steric stabilization of polyurethane dispersions accordingly requires long, hydrophilic side chains which do not react with isocyanates and which, like dimethylolpropionic acid, can be incorporated into the polyurethane prepolymer via two hydroxyl groups (DE 2551094). Particular suitability for this has been found to be possessed by polyethers (polyalkylene glycols) having two free closely neighbored hydroxyl groups at the same end of the molecule and a long polyalkylene sidechain having an alkoxy end (S. Dedrichs, European Coating Journal, page 565, 5, 2002, J. Fock, DE 3049746 A1).

The process of preparing such systems is very inconvenient and costly and proceeds via 4 stages proceeding from trifunctional alcohols such as glycerol or trimethylolpropane (J. Fock, DE 3049746 A1, EP 0043966).

DE10 2006 036 220 describes preparing similar compounds by reacting an α-amino-ω-alkoxypolyalkylene glycol with two equivalents of alkylene oxide. However, alkylene oxides and especially ethylene oxide are difficult to handle because of their high reactivity and cannot be processed in many large scale industrial plants.

In Macromolecules 2008, 41, 4622-4630, Fournier and Du Prez describe how so-called "click" chemistry can be used to introduce various functionalities as sidechains into polyurethanes. Polyurethanes having acetylene functions are synthesized and then azides are added onto the acetylenes to produce sidechains. Azides are often difficult to synthesize and handle on a large scale in particular.

It is additionally known, for example from H. Tomita et al. Journal of Polymer Science Part A: Polymer Chemistry 2001 (39), pages 162-168, that amines react with cyclic carbonates in an addition reaction to form hydroxyurethanes by ring opening.

The cited examples of sidechains in polyurethanes show how important it is to be able to introduce sidechains in the preparation of polyurethane-polyurea dispersions in a specific manner.

In view of the prior art, the problem addressed by the present invention was therefore that of providing a simple, broadly applicable, easily handleable and economical process for introducing sidechains into mainly linear polyurethane-polyurea chains.

It has now been found that, surprisingly, the reaction of primary and/or secondary monoamines or diamines with cyclic carbonates containing one hydroxyl group and optionally reacting the second amine function of diamines with compounds bearing one functional group which react with primary or secondary amines in an addition reaction lead in a very simple and economical manner to intermediate products which can be reacted with polyisocyanates and other isocyanate-reactive compounds to prepare polyurethane-polyurea prepolymers which by dispersal in water and extension with isocyanate-reactive polyamines lead to dispersed sidechain-bearing polyurethane-polyurea polymers and thus solve this problem.

The invention accordingly provides a process for preparing aqueous polyurethane-polyurea dispersions which comprises A) initially
A1) primary and/or secondary monoamines or diamines being reacted with
A2) cyclic carbonates which contain one hydroxyl group, wherein the molar ratio of A1) and A2) is determined such that in the case of monoamines A1) an arithmetic ratio of total primary and secondary amine groups to cyclic carbonate groups in the range from 0.8 to 1.2 is obtained and in the case of diamines A1) an arithmetic ratio of total primary and secondary amine groups to cyclic carbonate groups in the range from 1.8 to 2.2 is obtained, and
A3) in the case of diamines A1) the remaining primary and secondary amine groups are reacted with compounds bearing one functional group which reacts with primary or secondary amines in an addition reaction, so that no isocyanate-reactive groups are formed, wherein the amount of substance of A3) is determined such that an arithmetic ratio of total primary and secondary amine groups arithmetically remaining after reaction of A1) and A2) to amine-reactive groups in A3) in the range from 0.8 to 1.2 is obtained,
wherein the reaction with A3) can take place after, simultaneously with or before the reaction with A2),
B) subsequently an NCO-containing polyurethane prepolymer being produced by reaction of
B1) polyisocyanates with
B2) polymeric polyols and/or polyamines having number average molecular weights of more than 400 to 8000 g/mol,
B3) optionally low molecular weight compounds having number average molecular weights of 17-400 g/mol selected from the group consisting of mono- and polyalcohols, mono- and polyamines and amino alcohols,
B4) optionally isocyanate-reactive ionically or potentially ionically hydrophilizing compounds and/or isocyanate-reactive nonionically hydrophilizing compounds, and
B5) the reaction products from A),
C) the prepolymer from B) being dispersed in water, and
D) optionally the still free NCO groups of the prepolymer being reacted with isocyanate-reactive monoamines, polyamines, hydrazine and/or hydrazides, wherein the amount of substance thereof is determined such that an arithmetic ratio of isocyanate-reactive NH groups to NCO groups in the range from 0 to 1.2 is obtained, wherein said reaction D) can be effected partly or else wholly before or during the dispersing step C).

The reactions in step A), which are essential to the present invention, convert an isocyanate-reactive amine function into two isocyanate-reactive alcohol functions and optionally render a further isocyanate-reactive amine function unreactive toward isocyanate, so that the incorporation of groups at the amine function of A1) into the polyurethane-polyurea polymer takes place as sidechain and not as part of the polymer main chain.

The present invention further provides aqueous polyurethane-polyurea dispersions obtainable by the above process.

The present invention further provides for the use of the polyurethane-polyurea dispersions obtained according to the present invention for coating flexible sheetlike substrates, especially leather.

The present invention further provides a process for coating flexible sheetlike substrates, especially leather, by applying the polyurethane-polyurea dispersion of the present invention to the flexible sheetlike substrate, more particularly to the leather.

Suitable primary and secondary monoamines according to A1) are preferably compounds of structural formula (1),

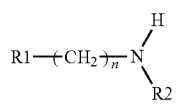

where
R1 is selected from the group of polyalkylene glycols having molecular weights up to 6000 g/mol, hydrocarbons having 1 to 26 carbon atoms, compounds consisting of 1-20 carbon atoms, 0-41 hydrogen atoms and 1-15 of the heteroatoms boron, silicon, nitrogen, phosphorus, oxygen, sulfur, chlorine, bromine and/or iodine, partially and/or completely fluorinated hydrocarbons having 1 to 26 carbon atoms, or polysiloxanes having molecular weights up to 5000 g/mol,
R2 is hydrogen or a hydrocarbon having one to 18 carbon atoms, and
n is from 0 to 12.

In a particularly preferred embodiment of the invention, R1 is selected from the group of polyalkylene glycols having molecular weights of 400 to 3000 g/mol.

In a further particularly preferred embodiment of the invention, R1 is selected from the group of hydrocarbons having 4 to 18 carbon atoms. It is further preferable for R1 to be an aliphatic hydrocarbon.

In a further particularly preferred embodiment of the invention, R1 is selected from the group of compounds consisting of 4-18 carbon atoms, 4-37 hydrogen atoms and 1-15 of the heteroatoms boron, silicon, nitrogen, phosphorus, oxygen, sulfur, chlorine, bromine and/or Iodine.

In a further particularly preferred embodiment of the invention, R1 is selected from the group of partially and/or completely fluorinated hydrocarbons having 4 to 18 carbon atoms.

In a further particularly preferred embodiment of the invention, R1 is selected from the group of polysiloxanes having molecular weights of 400 to 3000 g/mol.

In a further particularly preferred embodiment of the invention, R2 is hydrogen.

In a further particularly preferred embodiment of the invention, n is from 1 to 6.

Particular preference is given to primary monoamines according to A1) where
R1 is selected from the group of polyalkylene glycols having molecular weights up to 6000 g/mol, hydrocarbons having 1 to 26 carbon atoms, compounds consisting of 1-20 carbon atoms, 0-41 hydrogen atoms and 1-15 of the heteroatoms boron, silicon, nitrogen, phosphorus, oxygen, sulfur, chlorine, bromine and/or iodine, partially and/or completely fluorinated hydrocarbons having 1 to 26 carbon atoms, or polysiloxanes having molecular weights up to 5000 g/mol.

Particular preference is given to primary monoamines according to A1) where
R2 is hydrogen and
n is from 0 to 6.

Suitable primary and secondary diamines according to A1) are preferably compounds of structural formula (2),

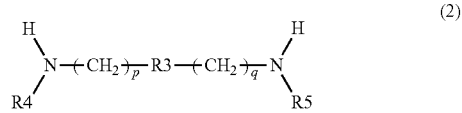

where
R3 is selected from the group of polyalkylene glycols having molecular weights up to 6000 g/mol, hydrocarbons having 1 to 26 carbon atoms, compounds consisting of 1-20 carbon atoms, 0-41 hydrogen atoms and 1-15 of the heteroatoms boron, silicon, nitrogen, phosphorus, oxygen, sulfur, chlorine, bromine and/or iodine, partially and/or completely fluorinated hydrocarbons having 1 to 26 carbon atoms, or polysiloxanes having molecular weights up to 5000 g/mol,
R4 and R5 are each independently hydrogen or hydrocarbons having one to 18 carbon atoms, and
p and q are each independently from 0 to 12.

In a particularly preferred embodiment of the invention, R3 is selected from the group of polyalkylene glycols having molecular weights of 400 to 3000 g/mol.

In a further particularly preferred embodiment of the invention, R3 is selected from the group of hydrocarbons having 4 to 18 carbon atoms. It is further preferable for R1 to be an aliphatic hydrocarbon.

In a further particularly preferred embodiment of the invention, R3 is selected from the group of compounds consisting of 4-18 carbon atoms, 4-37 hydrogen atoms and 1-15 of the heteroatoms boron, silicon, nitrogen, phosphorus, oxygen, sulfur, chlorine, bromine and/or iodine.

In a further particularly preferred embodiment of the invention, R3 is selected from the group of partially and/or completely fluorinated hydrocarbons having 4 to 18 carbon atoms.

In a further particularly preferred embodiment of the invention, R3 is selected from the group of polysiloxanes having molecular weights of 400 to 3000 g/mol.

In a further particularly preferred embodiment of the invention, R4 and R5 are each hydrogen.

In a further particularly preferred embodiment of the invention, p and q are each independently from 1 to 6.

Preference is given to primary diamines according to A1), where
R3 is selected from the group of polyalkylene glycols having molecular weights up to 6000 g/mol, hydrocarbons having 1 to 26 carbon atoms, compounds consisting of 1-20 carbon atoms, 0-41 hydrogen atoms and 1-15 of the heteroatoms boron, silicon, nitrogen, phosphorus, oxygen, sulfur, chlorine, bromine and/or iodine, partially and/or completely fluorinated hydrocarbons having 1 to 26 carbon atoms, or polysiloxanes having molecular weights up to 5000 g/mol,
R4 and R5 are hydrogen and
p and q are each independently from 0 to 6.

Suitable cyclic carbonates having a hydroxyl group according to A2) preferably conform to structural formula (5),

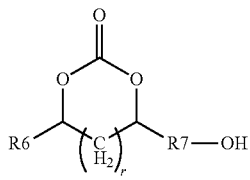

(5)

where
R6 is hydrogen or a hydrocarbon moiety of 1 to 18 carbon atoms,
R7 is non-present or is a hydrocarbon moiety of 1 to 18 carbon atoms, and
r is from 0 to 3.

Particular preference is given to compounds where
R6 is hydrogen or an alkyl moiety having 1 to 12 carbon atoms,
R7 is non-present or is an alkanediyl moiety having 1 to 12 carbon atoms, and
r is 0 or 1.

It is very particularly preferable for formula (5) to represent 4-(hydroxymethyl)-1,3-dioxolan-2-one.

The above-recited definitions for the moieties R1 and R3 are to be understood as meaning that R1 and R3 are obtained from the compounds of the recited type by the formal abstraction of one hydrogen atom in the case of R1 and two hydrogen atoms in the case of R3. When R1 and R3 in this sense represent compounds consisting of 1-20 carbon atoms, 0-41 hydrogen atoms and 1-15 of the heteroatoms boron, silicon, nitrogen, phosphorus, oxygen, sulfur, chlorine, bromine and/or iodine, they are generally hydrocarbons bearing functional groups with heteroatoms. The preferred classes of compounds to which these hydrocarbons bearing functional groups with heteroatoms belong are halogenated hydrocarbons, heterocyclic compounds with N, O, S as heteroatoms, urethanes, thiourethanes, ureas, thioureas, carboxylic esters and amides, carbonic esters, lactones, lactams, carboxylic anhydrides, carboximides, carbodiimides, ketones, thioketones, ethers, thioethers, acetals, ketals, nitriles, amidines, azides, nitro groups, tertiary amines, quaternary ammonium groups, mono-, di- or trialkoxysilanes, sulfuric esters and salts thereof, sulfonic esters and salts thereof, sulfones, sulfonamides, phosphoric esters and salts thereof, phosphonic esters and salts thereof, phosphines and phosphine oxides.

Particular preference among these is given to heterocyclic compounds with N, O, S as heteroatoms, urethanes, ureas, carboxylic esters and amides, carbonic esters, lactones, lactams, ketones, ethers, acetals, ketals, tertiary amines and quaternary ammonium groups, mono-, di- or trialkoxysilanes, sulfuric esters and salts thereof, sulfonic esters and salts thereof.

Suitable compounds according to A3) bear exactly one functional group which react with primary or secondary amines in an addition reaction, so that no isocyanate-reactive groups are formed. In addition, compounds according to A3) bear no further groups which are isocyanate reactive.

Functional groups reacting with primary or secondary amines in an addition reaction, so that no isocyanate-reactive groups are formed, can be for example: isocyanates, isothiocyanates, carbodiimides, ketenes, nitriles, isonitriles, cyclic anhydrides of dicarboxylic acids or olefins.

Preferred compounds according to A3) are monoisocyanates.

Particularly preferred compounds according to A3) are monoisocyanates whose isocyanate groups are not attached directly to an aromatic group. They can be more particularly alkyl monoisocyanates, cycloalkyl monoisocyanates or arylalkyl monoisocyanates.

In the process of the present invention, the procedure in reaction step A) differs according to whether monoamines or diamines are used as components A1). When monoamines A1) are used, only the reaction with components A2) is required and there is no reaction with components A3). When diamines A1) are used, a reaction with components A2) and components A3) is required. The reaction of diamines A1) with components A2) and A3) can be carried out at the same time or in succession, in which case the order is freely choosable. With both monoamines and diamines A1), the reactions with components A2) and, as the case may be, A3) can take place in one or more steps. Preferably, the reaction of A1) with A2) takes place in one step. The reaction of components A1) and components A2) and optionally A3) can be effected wholly or partly in the presence or absence of a solvent. In a preferred embodiment of the invention, the reaction of components A1) with components A2) is carried out without a solvent. When a solvent is used, it can be removed, or left in the mixture, before step B). When the solvent is to be left in the mixture, ketones and esters are preferred for use as solvents and methyl ethyl ketone, acetone and methyl acetate are particularly preferred.

The reaction of components A1) and components A2) and optionally A3) is preferably carried out at temperatures between −10° C. and +100° C. In a particularly preferred embodiment of the invention, the reaction of components A1) with components A2) is carried out at temperatures of 15-90° C. and, as the case may be, the reaction with components A3) is carried out at temperatures of 10-50° C.

The reaction of components A1) and components A2) and optionally A3) is preferably carried out at pressures of 0.8-5 bar. The optional removal of the solvent can also take place under reduced pressure.

The products from the reaction of diamines A1) with A2) or diamines A1) with A3) can immediately be used further for the reaction with A3) and A2), respectively, or interveningly stored. Similarly, the products, or their solutions, from process step A) can be immediately used for the B) reaction or interveningly stored.

In a preferred embodiment of the invention, the A) reaction is carried out without the use of catalysts.

The reactions in process step A) can be tracked in the reaction mixture. To this end, not only spectroscopic measurements, e.g., infrared or near-infrared spectra, determinations of the refractive index, but also chemical analyses, such as titrations, of samples removed can be carried out. These methods of determination are known to a person skilled in the art. For example, the residual level of amine groups can be determined via titration. It can also be tracked via IR spectroscopy for example, as in the case of the reaction of A1) with A2) where the band of the stretching vibration of the C═O double bond of the A2) carbonate disappears and the band of the stretching vibration of the C═O double bond of the urethane of the reaction product becomes larger. In the case of the reaction with A3), for example, the disappearance of the band of the multiple bond of component A3) can be observed, which is particularly successful in the case of isocyanates A3).

Suitable polyisocyanates according to B1) have the formula $X(NCO)_p$, where p is a number from more than 1 to 4, preferably from 2 to 3 and more preferably 2 and X is an aliphatic, cycloaliphatic, aromatic or araliphatic hydrocarbon moiety. Preferably X is an aliphatic hydrocarbon moiety having 3 to 20 carbon atoms, a cycloaliphatic hydrocarbon moiety having 5 to 15 carbon atoms, an aromatic hydrocarbon moiety having 6 to 15 carbon atoms or an araliphatic hydrocarbon moiety having 7 to 15 carbon atoms. Particular preference is given to diisocyanates whose isocyanate groups are not attached directly to an aromatic group. When polyisocyanates of the formula $X(NCO)_p$ are used that are mixtures of compounds having different numbers of isocyanate groups, then p is the number average of the isocyanate groups present.

Examples of such diisocyanates are tetramethylene diisocyanate, hexamethylene diisocyanate, dodecamethylene diisocyanate, 1,4-diisocyanatocyclohexane, 1-isocyanato-3,5,5-trimethyl-5-isocyanatomethylcyclohexane (IPDI), 2,2-bis(4-iso-cyanatocyclohexyl)propane, trimethylhexane diisocyanate, 1,4-diisocyanatobenzene, 2,4-diisocyanatotoluene, 2,6-diisocyanatotoluene, 4,4'-diisocyanatodiphenylmethane, 2,4'-diisocyanatodiphenylmethane, p-xylylene diisocyanate, tetramethylxylylene diisocyanate (TMXDI), the isomers of 4,4'-diisocyanatodicyclohexylmethane such as the trans/trans, the cis/cis and the cis/trans isomer, and mixtures of these compounds.

Polymeric polyols or polyamines according to B2) come typically from the group of polycarbonates, polyesters, polyethers, polyacrylates, polyolefins and polysiloxanes containing hydroxyl or amino groups, as are known from, for example, Ullmann's Encyclopedia of Industrial Chemistry 2005, DOI: 10.1002/14356007.a21_665.pub2 "Polyurethanes", Chapter 3, W. Friederichs.

Suitable polycarbonate polyols are those as may be obtained by, for example, reacting phosgene with an excess of polyhydric alcohols. Examples of suitable dihydric alcohols include ethylene glycol, propane-1,2-diol, propane-1,3-diol, butane-1,2-diol, butane-1,3-diol, butane-1,4-diol, butene-1,4-diol, butyne-1,4-diol, pentane-1,5-diol, neopentyl glycol, 2-butyl-2-ethyl-1,3-propanediol, bis(hydroxymethyl)-cyclohexanes such as 1,4-bis(hydroxymethyl)cyclohexane, 2-methylpropane-1,3-diol, methylpentanediols, and also diethylene glycol, triethylene glycol, tetraethylene glycol, polyethylene glycol, dipropylene glycol, polypropylene glycol, dibutylene glycol and polybutylene glycols.

Preferred alcohols are of the general formula $HO-(CH_2)_x-OH$, where x is a number from 1 to 20, preferably a number from 2 to 20. x is preferably an even number. Examples of such alcohols are ethylene glycol, butane-1,4-diol, hexane-1,6-diol, octane-1,8-diol and dodecane-1,12-diol. Additionally preferred are neopentyl glycol and 2-butyl-2-ethyl-1,3-propanediol and methylpentanediols. Proportionally it is also possible to use higher polyhydric alcohols such as glycerol, trimethylolpropane, 1,2,6-hexanetriol, 1,2,4-butanetriol, pentaerythritol, quinitol, mannitol and sorbitol.

Also suitable, furthermore, are polyester polyols, which are obtained by reacting polyhydric alcohols with polybasic carboxylic acids. In place of the free polycarboxylic acids it is also possible to use the corresponding polycarboxylic anhydrides or corresponding polycarboxylic esters of lower alcohols, or mixtures thereof, to prepare the polyester polyols. The polycarboxylic acids may be aliphatic, cycloaliphatic, araliphatic, aromatic or heterocyclic and may where appropriate be substituted, by halogen atoms for example, and/or unsaturated. Examples that may be mentioned thereof include the following: suberic acid, azelaic acid, phthalic acid, isophthalic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, dimeric fatty acids. Preferred dicarboxylic acids are of the general formula $HOOC-(CH_2)_y-COOH$, where y is a number from 1 to 20, preferably an even number from 2 to 20, such as succinic acid, adipic acid, sebacic acid and dodecanedicarboxylic acid, for example. Suitable polyhydric alcohols, preferably diols, include the low molecular weight alcohols specified as synthesis components for the polycarbonate polyols.

Also suitable are lactone-based polyester diols, which are homopolymers or copolymers of lactones, preferably hydroxyl-terminal adducts of lactones with suitable polyfunctional starter molecules. Suitable lactones are preferably those deriving from compounds of the general formula $HO-(CH_2)_z-COOH$, where z is a number from 1 to 20 and where one hydrogen atom of a methylene unit can also be substituted by a $C_1$ to $C_4$ alkyl radical. Examples are ε-caprolactone, β-propiolactone, γ-butyrolactone and/or methyl-ε-caprolactone, and mixtures thereof. Examples of suitable starter components include the low molecular weight polyhydric alcohols specified above as synthesis component for the polycarbonate polyols. The corresponding polymers of ε-caprolactone are particularly preferred. Lower polyester diols or polyether diols as well can be used as starters for preparing the lactone polymers. In place of the polymers of lactones it is also possible to use the corresponding, chemically equivalent polycondensates of the hydroxyl carboxylic acids corresponding to the lactones.

Likewise suitable as polyols are polyether diols. They are obtainable in particular by polymerization of ethylene oxide, propylene oxide, butylene oxide, tetrahydrofuran, styrene oxide, epichlorohydrin, or part-fluorinated or perfluorinated derivatives of these compounds, with itself or with themselves, in the presence for example of $BF_3$, or by addition reaction of these compounds, where appropriate in a mixture or in succession, with starter components containing reactive hydrogen atoms, such as alcohols or amines, examples being water, ethylene glycol, propane-1,2-diol, propane-1,3-diol, 1,2-bis(4-hydroxydiphenyl)propane or aniline.

Likewise suitable as monomers are polyhydroxy olefins, preferably those having 2 terminal hydroxyl groups, such as α,ω-dihydroxypolybutadiene, α,ω-dihydroxy-polymethacrylic esters or α,ω-dlhydroxypolyacrylic esters. Such compounds are known for example from EP-A-0 622 378 A1. Further suitable polyols are polyacetals, polysiloxanes and alkyd resins.

Suitable low molecular weight compounds according to B3) are the low molecular weight polyhydric alcohols, preferably diols and triols, specified above as synthesis component for the polycarbonate polyols.

In addition, monoalcohols are also suitable, preferably primary or secondary alcohols, such as, for example, methanol, ethanol, propanol, isopropanol, 1-butanol, 2-butanol, isobutanol, 1-hexanol, 1-octanol, 2-ethylhexanol, 1-decanol, 1-dodecanol, 1-tetradecanol, 1-hexadecanol, 1-octadecanol and 1-eicosanol.

Amines or amino alcohols which are obtained, for example, by exchanging the alcohol groups of the alcohols mentioned in the last two paragraphs for amino groups or monoalkylamino groups are likewise suitable.

Ionically or potentially ionically hydrophilizing compounds according to B4) are understood as meaning all compounds which have at least one group reactive towards isocyanate, preferably a hydroxyl or amino group, and at least one functionality which is ionic or potentially ionic. Examples of ionic and potentially ionic groups are —COOY, —$SO_3Y$, —$PO(OY)_2$ (Y for example=H, $NH_4^*$, metal cation), —$NR_2$, —$NR_3^+$ (R=H, alkyl, aryl). Suitable ionically or potentially ionically hydrophilizing compounds are known to the person skilled in the art and are mentioned or explained, for example, in DE 10 2004 002 526 A1 in paragraph [0032].

The isocyanate-reactive nonionically hydrophilizing compounds according to B4) are polyoxyalkylene ethers comprising at least one hydroxyl or amino group. Suitable nonionically hydrophilizing compounds are known to a person skilled in the art and, respectively, named and explained in DE 10 2004 002 526 A1 in paragraphs [0035] to [0039] or else in DE 10 2006 036220 A1.

When the compounds according to B5) contain ionic, potentially ionic or nonionic hydrophilizing groups as described in B4), the compounds according to B5) can replace the compounds according to B4) and assume their hydrophilizing function in respect of the dispersibility of the prepolymer.

To disperse the prepolymer, it is also possible to use emulsifiers and surfactants that are not chemically bound into the prepolymer. However, this procedure is not preferred.

In the process of the present invention, the NCO-containing polyurethane prepolymer is preferably prepared by the reaction of 10% to 45% by weight of component B1), 30% to 80% by weight of component B2), 0% to 10% by weight, particularly 0.1% to 9% by weight of component B3), 0% to 20% by weight, particularly 0.1% to 19% by weight of component B4) and 0.1% to 40% by weight of component B5), wherein the sum total of all the components adds up to 100% by weight.

The process of the present invention generally comprises a step in which constituent B1) is mixed with the constituents B2) to B5) and optionally a solvent at below the reaction temperature. The order in which constituent B1), constituents B2) to B5) and, if used, the solvent are added is freely choosable. The reaction of constituent B1) and of constituents B2) to B5) is preferably initiated by temperature elevation. Preferred solvents are ketones or esters, with acetone or methyl acetate being particularly preferred. The reaction is preferably carried out at temperatures in the range from 50 to 120° C.

The reaction of constituent B1) and constituents B2) to B5) can be carried out in the presence or absence of a solvent. In a preferred embodiment of the invention, a prepolymer comprising isocyanate groups is prepared from constituent B1) with constituents B2) to B5) with or without a solvent and, if necessary, dissolved in solvents after the reaction has been carried out. Next the prepolymer or prepolymer solution is dispersed in water. Preferably the prepolymer or prepolymer solution is added to initially charged water or water is added to the initially charged prepolymer solution and a chain extension reaction according to step B) is carried out with polyamines. The extension reaction can be carried out partially or else completely before the dispersing. Finally, the solvent is optionally distilled off.

The present invention process for preparing the aqueous PUR dispersions can be carried out in one or more stages in a homogeneous phase or—in the case of a multi-stage reaction—partly in a disperse phase. Complete or partial polyaddition out of B1)-B5) is followed by a dispersing, emulsifying or dissolving step. This is optionally followed by a further polyaddition or modification in disperse phase.

In the process of the present invention, the catalysts known for accelerating the isocyanate addition reaction, for example triethylamine, 1,4-diazabicyclo[2.2.2]-octane, dibutyltin oxide, tin dioctoate or dibutyltin dilaurate, tin bis(2-ethylhexanoate) or other organometallic compounds can be included in the initial charge or dosed in later.

Subsequently any of constituents B1)-B5) not added at the beginning of the reaction are dosed in.

In the preparation of the polyurethane prepolymer in step B), the molar amount-of-substance ratio of the total amount of isocyanate groups from B1) to the total amount of isocyanate-reactive groups from B2) to B5) is in the range from 1.0 to 3.5 and preferably in the range from 1.2 to 2.7.

The reaction of components B1)-B5) to form the prepolymer is partial or complete, but preferably complete. The degree of conversion is typically monitored by following the NCO content of the reaction mixture. This can be done using either spectroscopic measurements, examples being infrared or near-infrared spectra, determinations of the refractive index, or else using chemical analyses, such as titrations, on samples taken. These methods of determining the NCO content are known to a person skilled in the art. In this way, polyurethane prepolymers containing free isocyanate groups are obtained, in bulk (without solvent) or in solution.

During or after the preparation of the polyurethane prepolymers from B1) to B5), and if it has not already been carried out in the starting molecules, the anionically and/or cationically dispersing groups are converted partly or fully to the salt form. In the case of anionic groups this is done using bases such as ammonia, ammonium carbonate or ammonium hydrogen carbonate, trimethylamine, triethylamine, tributylamine, diisopropylethylamine, dimethylethanolamine, diethylethanolamine, triethanolamine, potassium hydroxide or sodium carbonate, preferably triethylamine, triethanolamine, dimethylethanolamine or diisopropylethylamine. The molar amount of substance of the bases is between 50% and 150%, preferably between 85% and 120%, of the amount of substance of the anionic groups. In the case of cationic groups, dimethyl sulfate, succinic acid or formic acid is used. Where only nonionically hydrophilized compounds B4) with ether groups are used, the neutralization step is not needed. Neutralization may also take place simultaneously with dispersion, with the dispersing water already containing the neutralizing agent.

In the subsequent process step, the compounds from D) are reacted with the remaining isocyanate groups. This chain extension/termination can be carried out either in solvent prior to dispersal, during dispersal or preferably in water after dispersal.

Amino alcohols, mono-, di- or polyamines and hydrazine or hydrazides serve for the reaction of the still free NCO groups in step D). Monofunctional compounds for the extension reaction may be amino alcohols and monoamines as mentioned under B3), preferably amino alcohols or long-chain monoamines, such as, for example, ethanolamine, diethanolamine, 1-hexylamine, 1-octylamine, 1-decylamine, 1-dodecylamine, 1-tetradecylamine, 1-hexadecylamine, 1-octadecylamine, 1-eicosylamine. Bi- or polyfunctional compounds which may be used are, for example, ethylenediamine, 1,2- and 1,3-diaminopropane, 1,4-diaminobutane, 1,6-diaminohexane, isophoronediamine, the isomer mixture of 2,2,4- and 2,4,4-trimethylhexamethylenediamine, 2-methylpentamethylenediamine, piperazine, 2,5- dimethylpiperazine, 4,4'-diaminocyclohexylmethane, 1,4-diaminocyclohexane, aminoethylethanolamine, aminopropylethanolamine, sodium (2-aminoethyl)-2-aminoethylsulfonate, diethylenetriamine, triethylenetetramine, tetraethylene-pentamine, 1,3- and 1,4-xylylenediamine, α,α,α',α'-tetramethyl-1,3- and 1,4-xylylenediamine and 4,4'-diaminodicyclohexylmethane, dimethylethylenediamine, hydrazine, adipic acid dihydrazide or oxalic acid dihydrazide.

The still free NCO groups can also be reacted in step D) using water, which converts unconverted isocyanate groups into amines by releasing carbon dioxide which are able to react with further isocyanate groups by chain extension.

The degree of chain extension, i.e., the equivalence ratio of the newly added reactive NH groups of the compounds used for chain extension in D) to free NCO groups of the prepolymer is preferably between 0 and 1.2, and more preferably between 0.7 and 1.2.

Compounds D) can be used in the process of the present invention individually or mixed, optionally diluted with water and/or a solvent, in which case any order of addition is possible in principle.

The polyurethane-polyurea dispersions of the present invention are preferably prepared either by introducing the solvent-free or dissolved prepolymer or the chain-extended polyurethane polymer into the dispersing water, where appropriate with strong shearing, such as vigorous stirring, for example, or, conversely, the dispersing water is stirred into the prepolymer or polymer or solutions thereof.

The dispersions obtained in this way have a solids content of 10% to 70%, preferably 15% to 65% and more preferably 20% to 60% by weight.

Depending on degree of neutralization and ionic group content, the dispersion can be made very finely particulate, so that it has virtually the appearance of a solution; or alternatively, very coarsely particulate formulations are possible that likewise have adequate stability.

The B2) to B4) and D) components are preferably chosen such that the sum of the molar amounts of substance consists to an extent of more than 70% of compounds having two isocyanate-reactive groups and to an extent of more than 95% of compounds having one or two isocyanate-reactive groups, wherein carboxylic acid groups are regarded as isocyanate nonreactive.

The invention further provides mixtures of the polyurethane-polyurea dispersions of the invention with other aqueous binders and crosslinkers which are used for producing coating materials. In this context it is also possible to use the auxiliaries and additives known per se from coating technology, such as thickeners, fillers, pigments, waxes, texture agents, dyes, solvents, flow control assistants, and crosslinkers, for example. Particularly preferred auxiliaries and additives are nanoparticles, partially fluorinated or perfluorinated polymers and silicones. Especially preferred auxiliaries and additives are those described in the following references: DE 4328917, DE 10 2004 040 266, DE19649953, WO-2005/078182, U.S. Pat. Nos. 6,171,515, 4,599,438, 5,385,999, DE 4240274.

The present invention further provides coatings of the polyurethane-polyurea dispersions of the present invention and/or their abovementioned mixtures on any desired substrates such as for example metal, wood, glass, glass fibers, carbon fibers, stone, ceramic materials, concrete, rigid and flexible plastics of various kinds, woven and non-woven textiles, leather, split leather, artificial leather, paper, hard fibers, straw and bitumen, which prior to coating may also have been treated with customary primers or after coating may be provided with optionally further coatings.

Preferred substrates are leather and artificial leather. Particularly preferred substrates are full grain and buffed leather and also split leather.

EXAMPLES

The ATR-FTIR measurements were carried out using a Perkin Elmer Paragon 1000 with diamond ATR unit. The NCO values were determined by reacting a removed sample with an excess of dibutylamine and backtitration with hydrochloric acid, and are reported in % by weight.

Example 1

10 g (77.4 mmol) of 1-octylamine are initially charged at 25° C. before 9 g (76.2 mmol/98.4%) of 4-(hydroxymethyl)-1,3-dioxolan-2-one are added under agitation. The mixture heats up to 73° C. in the process. It is stirred at 75° C. for a further two hours. An IR spectrum shows complete conversion (no peak left at 1792 $cm^{-1}$, new peaks at 1691 $cm^{-1}$ and 1540 $cm^{-1}$).

10 g of the product obtained in this way are initially charged together with 147.2 g (72.8 mmol) of a polypropylene glycol having an average molar mass of 2022 g/mol, 41 g (40.2 mmol) of a polypropylene glycol having an average molar mass of 1020 g/mol and 12.1 g (90 mmol) of dimethylolpropionic acid and thoroughly commixed. This is followed by the addition of 104.3 g (470 mmol) of isophorone diisocyanate and 7.1 g (27 mmol) of bis(4-isocyanatocyclohexyl)methanes and the mixture is heated to 90° C. for two hours. The residual NCO value is then 6.34%. The mixture is cooled down to 60° C., 9.1 g of triethylamine are stirred in, and everything is transferred into 835 g of water (5° C.) under vigorous agitation. The dispersion is gradually admixed with a cold solution of 10° C. of 11.3 g (226 mmol) of hydrazine monohydrate in 75 g of water added by dropwise addition to obtain a storage-stable polyurethane dispersion having a dry matter content of 25%.

Example 2

10 g (76.8 mmol) of N-(2-aminoethyl)morpholine are initially charged at 25° C. before 8.84 g (74.9 mmol/97.5%) of 4-(hydroxymethyl)-1,3-dioxolan-2-one are added under agitation. The mixture heats up to 68° C. in the process. It is stirred at 70° C. for a further two hours. An IR spectrum shows complete conversion (no peak left at 1793 $cm^{-1}$, new peaks at 1693 $cm^{-1}$ and 1534 $cm^{-1}$).

18.84 g of the product obtained in this way are initially charged together with 402.2 g (200 mmol) of polytetramethylene glycol having an average molar mass of 2011 g/mol and 26.8 g (200 mmol) of dimethylolpropionic acid and thoroughly commixed. This is followed by the addition of 124.3 g (560 mmol) of isophorone diisocyanate and 42 g (200 mmol) of an isomeric mixture consisting of 2,2,4- and 2,4,4-trimethylhexamethylene 1,6-diisocyanate (40:60) and the mixture is heated to 85° C. for three hours. The residual NCO value is then 3.62%. The mixture is cooled down to 60° C., 21.2 g of triethylamine are stirred in, and everything is transferred into 975 g of water (5° C.) under vigorous agitation. The dispersion is gradually admixed with a cold solution of 10° C. of 41.8 g (246 mmol) of isophoronediamine in 150 g of water added by dropwise addition to obtain a storage-stable polyurethane dispersion having a dry matter content of 35%.

Example 3

10 g (70.3 mmol) of N-(3-aminopropyl)-2-pyrrolidinone are initially charged at 25° C. and 8 g (67.7 mmol/96.3%) of 4-(hydroxymethyl)-1,3-dioxolan-2-one are added under agitation. The mixture heats up to 75° C. in the process. It is stirred at 75° C. for a further five hours. An IR spectrum shows complete conversion (no peak left at 1793 cm$^{-1}$, new peak at 1534 cm$^{-1}$ and new shoulder on peak at 1654 cm$^{-1}$).

18 g of the product obtained in this way are initially charged together with 194.3 g (200 mmol) of a polycarbonate diol (based on 1,6-hexanediol) having an average molar mass of 971.4 g/mol, 1.8 g (20 mmol) of 1,4-butanediol and 26.8 g (200 mmol) of dimethylolpropionic acid and thoroughly commixed. This is followed by the addition of 142.8 g (850 mmol) of hexamethylene diisocyanate and the mixture is heated to 85° C. for 2.5 hours. The residual NCO value is then 7.69%. The mixture is dissolved in 200 g methyl acetate and cooled down to 35° C. 20.2 g of triethylamine are stirred in and thereafter 795 g of water (10° C.) are added under vigorous agitation. The dispersion is gradually admixed with a cold solution at 10° C. of 16.7 g (334 mmol) of hydrazine monohydrate in 75 g of water added by dropwise addition. The methyl acetate is removed in a vacuum distillation at about 200 mbar to obtain a storage-stable polyurethane dispersion which is adjusted with water to a dry matter content of 30%.

Example 4

25 g (38.2 mmol) of methyl polyalkylene glycol amine (alkylene ratio: ethylene to propylene 3:1, average molar mass 655 g/mol) are initially charged at 25° C. and 4.1 g (34.7 mmol/90.8%) of 4-(hydroxymethyl)-1,3-dioxolan-2-one are added under agitation. The mixture heats up to 28° C. in the process. It is stirred at 60° C. for three days. An IR spectrum shows complete conversion (no peak left at 1796 cm$^{-1}$, new peaks at 1717 cm$^{-1}$ and 1529 cm$^{-1}$).

29.1 g of the product obtained in this way are initially charged together with 493.8 g (250 mmol) of a polycaprolactone diol (initiated with neopentyl glycol) having an average molar mass of 1975 g/mol, 5.2 g (50 mmol) of neopentyl glycol and 26.8 g (200 mmol) of dimethylolpropionic acid, and dissolved in 206 g of acetone. This is followed by the addition of 199.8 g (900 mmol) of isophorone diisocyanate and 2 g of triethylamine and the mixture is refluxed for four hours. The residual NCO value is then 2.85%. The mixture is cooled down to 30° C., 18.2 g of triethylamine are stirred in and 1500 g of water (10° C.) are added under vigorous agitation. The dispersion is gradually admixed with a cold solution at 10° C. of 17 g (283 mmol) of ethylene-diamine in 100 g of water added by dropwise addition. The acetone is removed in a vacuum distillation at about 200 mbar to obtain a storage-stable polyurethane dispersion which is adjusted with water to a dry matter content of 32%.

Example 5

50 g (77.3 mmol) of polyoxyalkylenediamine (alkylene ratio: ethylene to propylene 2:3, average molar mass 647 g/mol) are initially charged at 25° C. and 9.2 g (77.9 mmol/100.8%) of 4-(hydroxymethyl)-1,3-dioxolan-2-one are added under agitation. The mixture heats up to 30° C. in the process. It is stirred at 60° C. for three days. An IR spectrum shows complete conversion (no peak left at 1796 cm$^{-1}$, new peaks at 1716 cm$^{-1}$ and 1528 cm$^{-1}$). After the product has cooled down to 25° C., 7.3 g (73.7 mmol/96.3%) of n-butyl isocyanate are added under agitation. The temperature climbs to 67° C. in the process. After one hour of slow cooling down to 25° C., an IR spectrum shows complete conversion (no peak at about 2260 cm$^{-1}$, new peak at 1639 cm$^{-1}$, peak enlargement and shifting from 1528 cm$^{-1}$ to 1554 cm$^{-1}$).

66.5 g of the product obtained in this way are initially charged together with 153 g (150 mmol) of a polypropylene glycol having an average molar mass of 1020 g/mol and thoroughly commixed. This is followed by the addition of 77.7 g (350 mmol) of isophorone diisocyanate and 0.1 g of dibutyltin dilaurate and the mixture is heated to 75° C. for 2.5 hours. The residual NCO value is then 3.08%. The mixture is dissolved in 100 g of acetone and cooled down to 30° C. 615 g of water (10° C.) are added under vigorous agitation. The dispersion is gradually admixed with a cold solution at 10° C. of 7.7 g (103.5 mmol) of propylenediamine in 75 g of water added by dropwise addition. The acetone is removed in a vacuum distillation at about 200 mbar to obtain a storage-stable polyurethane dispersion which is adjusted with water to a dry matter content of 30%.

Example 6

37.2 g of α,ω-di(3-aminopropyl)polydimethylsiloxane (40 mmol, average molar mass 931 g/mol) are initially charged at 25° C. and 4.7 g (40 mmol/100%) of 4-(hydroxymethyl)-1,3-dioxolan-2-one are added under agitation. The mixture heats up to 40° C. in the process. It is stirred at 60° C. for one hour. An IR spectrum shows complete conversion (no peak left at 1796 cm$^{-1}$, new peaks at 1702 cm$^{-1}$ and 1541 cm$^{-1}$). The product is dissolved in 500 g of methyl acetate and 4.1 g (41 mmol/102.5%) of n-butyl isocyanate are added at 25° C. The temperature climbs by a further 3° C. or so in the process. After 10 min an IR spectrum shows complete conversion (no peak at about 2260 cm$^{-1}$, new peak at 1632 cm$^{-1}$, peak enlargement and shifting from 1541 cm$^{-1}$ to 1570 cm$^{-1}$).

The resulting solution of 46 g of the product in 500 g of methyl acetate is initially charged together with 394.2 g (400 mmol) of a poly(hexanediol adipate)diol having an average molar mass of 985.5 g/mol and 53.6 g (400 mmol) of dimethylolpropionic acid and thoroughly commixed. This is followed by the addition of 360.8 g (1625 mmol) of isophorone diisocyanate and 3.04 g of triethylamine and the mixture is refluxed for four hours. The residual NCO value is then 4.70%. The mixture is cooled down to 40° C., 40.4 g of triethylamine are stirred in and 1760 g of water (10° C.) are then added under vigorous agitation. The dispersion is gradually admixed with a cold solution at 10° C. of 36.1 g (721 mmol) of hydrazine monohydrate in 175 g of water added by dropwise addition. The methyl acetate is removed in a vacuum distillation at about 200 mbar to obtain a storage-stable polyurethane dispersion which is adjusted with water to a dry matter content of 30%.

What is claimed is:
1. A process for preparing aqueous polyurethane-polyurea dispersions comprising a sidechain-bearing polyurethane-polyurea polymer, the process comprising the steps of
   A) initially
      A1) reacting primary monoamines, secondary monoamines or a mixture thereof comprising a group which is incorporated as sidechain into the polyurethane-polyurea polymer, with
      A2) cyclic carbonates containing one hydroxyl group, wherein the molar ratio of A1) and A2) is determined such that an arithmetic ratio of total primary and/or secondary amine groups to cyclic carbonate groups in the range from 0.8 to 1.2 is obtained, B) subsequently producing an NCO-containing polyurethane prepolymer by reacting
B1) polyisocyanates with
B2) polymeric polyols, polyamines or a mixture thereof having number average molecular weights of more than 400 to 8000 g/mol,
B3) optionally low molecular weight compounds having number average molecular weights of 17-400 g/mol selected from the group consisting of monoalcohols, polyalcohols, monoamines, polyamines and amino alcohols,
B4) optionally isocyanate-reactive ionically or potentially ionically hydrophilizing compounds, isocyanate-reactive nonionically hydrophilizing compounds or a mixture thereof, and
B5) the reaction products from A), C) the prepolymer from B) being dispersed in water, D) optionally reacting the still free NCO groups of the prepolymer with isocyanate-reactive monoamines, polyamines, hydrazine, hydrazides or a mixture thereof, wherein the amount of substance thereof is determined such that an arithmetic ratio of isocyanate-reactive NH groups to NCO groups in the range from 0 to 1.2 is obtained, wherein said reaction D) can be effected partly or else wholly before or during the dispersing step C), and wherein the A1) components are monoamines of structural formula (1)

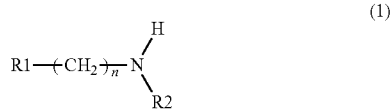

wherein
R1 is selected from the group consisting of partially and/or completely fluorinated hydrocarbons having 4 to 18 carbon atoms, polysiloxanes having molecular weights of 400 to 5000 g/mol, and mixtures thereof,
R2 is hydrogen or hydrocarbons having one to 18 carbon atoms, and
n is from 0 to 12.

2. The process according to claim 1, wherein
E) all reactions in A) are effected in aliphatic ketones or esters, and/or the prepolymer obtained from step B) is either prepared in aliphatic ketones or esters and/or after the reaction in step B) dissolved/diluted in aliphatic ketones or esters, and finally after steps A) to D) the solvent is optionally distilled off.

3. The process according to claim 1, wherein the A2) components are cyclic carbonates of structural formula (5)

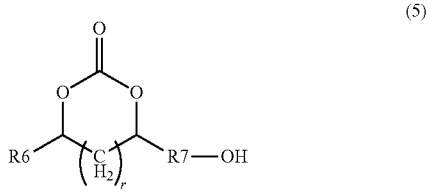

wherein
R6 is hydrogen or a hydrocarbon moiety of 1 to 18 carbon atoms,
R7 is non-present or is a hydrocarbon moiety of 1 to 18 carbon atoms, and
r is from 0 to 3.

4. The process according to claim 1, wherein the A2) component is 4-(hydroxymethyl)-1,3-dioxolan-2-one.

5. The process according to claim 1, wherein the B1) components are diisocyanates.

6. The process according to claim 1, wherein the B1) components are diisocyanates whose isocyanate groups are not attached directly to an aromatic group.

7. The process according to claim 1, wherein total B2) to B4) and D) components consist in molar terms of more than 70% of compounds having two isocyanate-reactive groups and of more than 95% of compounds having one or two isocyanate-reactive groups, wherein carboxylic acid groups are regarded as isocyanate nonreactive.

8. The process according to claim 1, wherein step D) is performed and an arithmetic ratio of isocyanate-reactive NH groups to NCO groups in the range from 0.7 to 1.2 is obtained.

9. The process according to claim 1, wherein the NCO-containing polyurethane prepolymer is obtained by reaction of 10% to 45% by weight of component B1), 30% to 80% by weight of component B2), 0% to 10% by weight of component B3), 0% to 20% by weight of component B4) and 0.1% to 40% by weight of component B5), wherein the sum total of all the components equals 100% by weight.

10. A process for preparing aqueous polyurethane-polyurea dispersions comprising a sidechain-bearing polyurethane-polyurea polymer, the process comprising the steps of A) initially
A1) reacting primary diamines, secondary diamines or a mixture thereof comprising a group which is incorporated as sidechain into the polyurethane-polyurea polymer, with
A2) cyclic carbonates containing one hydroxyl group, wherein the molar ratio of A1) and A2) is determined such that an arithmetic ratio of total primary and/or secondary amine groups to cyclic carbonate groups in the range from 1.8 to 2.2 is obtained, and
A3) the remaining primary and/or secondary amine groups are reacted with compounds bearing one functional group reacting with primary and/or secondary amines in an addition reaction, so that no isocyanate-reactive groups are formed, wherein the amount of substance of A3) is determined such that an arithmetic ratio of total primary and/or secondary amine groups arithmetically remaining after reaction of A1) and A2) to amine-reactive groups in A3) in the range from 0.8 to 1.2 is obtained,
wherein the reaction with A3) can take place after, simultaneously with or before the reaction with A2), B) subsequently producing an NCO-containing polyurethane prepolymer by reacting
B1) polyisocyanates with
B2) polymeric polyols, polyamines or a mixture thereof having number average molecular weights of more than 400 to 8000 g/mol,
B3) optionally low molecular weight compounds having number average molecular weights of 17-400 g/mol selected from the group consisting of monoalcohols, polyalcohols, monoamines, polyamines and amino alcohols, B4) optionally isocyanate-reactive ionically or potentially ionically hydrophilizing compounds, isocyanate-reactive nonionically hydrophilizing compounds or a mixture thereof, and B5) the reaction products from A), C) the prepolymer from B) being dispersed in water, and D) optionally reacting the still free NCO groups of the prepolymer with isocyanate-reactive monoamines, polyamines, hydrazine, hydrazides or a mixture thereof, wherein the amount of substance thereof is determined such that an arithmetic ratio of isocyanate-reactive NH groups to NCO groups in the range from 0 to 1.2 is obtained, wherein said reaction D) can be effected partly or else wholly before or during the dispersing step C), and wherein the A1) components are diamines of structural formula (2)

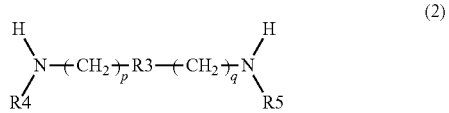
(2)

wherein

R3 is selected from the group consisting of partially and/or completely fluorinated hydrocarbons having 4 to 18 carbon atoms, colysiloxanes having molecular weights of 400 to 5000 g/mol, and mixtures thereof, R4 and R5 are each independently hydrogen or hydrocarbons having one to 18 carbon atoms, and p and q are each independently from 0 to 12.

11. The process according to claim 10, wherein

E) all reactions in A) or only the reaction with A3) is effected in aliphatic ketones or esters, and/or the prepolymer obtained from step B) is either prepared in aliphatic ketones or esters and/or after the reaction in step B) dissolved/diluted in aliphatic ketones or esters, and finally after steps A) to D) the solvent is optionally distilled off.

12. The process according to claim 10, wherein the A2) components are cyclic carbonates of structural formula (5)

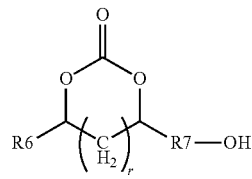
(5)

wherein

R6 is hydrogen or a hydrocarbon moiety of 1 to 18 carbon atoms,

R7 is non-present or is a hydrocarbon moiety of 1 to 18 carbon atoms, and r is from 0 to 3.

13. The process according to claim 10, wherein the A2) component is 4-(hydroxymethyl)-1,3-dioxolan-2-one.

14. The process according to claim 10, wherein the A3) components are monoisocyanates.

15. The process according to claim 10, wherein the A3) components comprise isocyanate groups not attached directly to an aromatic group.

16. The process according to claim 10, wherein the B1) components are diisocyanates.

17. The process according to claim 10, wherein the B1) components are diisocyanates whose isocyanate groups are not attached directly to an aromatic group.

18. The process according to claim 10, wherein total B2) to B4) and D) components consist in molar terms of more than 70% of compounds having two isocyanate-reactive groups and of more than 95% of compounds having one or two isocyanate-reactive groups, wherein carboxylic acid groups are regarded as isocyanate nonreactive.

19. The process according to claim 10, wherein step D) is performed and an arithmetic ratio of isocyanate-reactive NH groups to NCO groups in the range from 0.7 to 1.2 is obtained.

20. The process according to claim 10, wherein the NCO-containing polyurethane prepolymer is obtained by reaction of 10% to 45% by weight of component B1), 30% to 80% by weight of component B2), 0% to 10% by weight of component B3), 0% to 20% by weight of component B4) and 0.1% to 40% by weight of component B5), wherein the sum total of all the components equals 100% by weight.

* * * * *